(12) United States Patent
Krause et al.

(10) Patent No.: US 8,867,930 B2
(45) Date of Patent: Oct. 21, 2014

(54) SYSTEM AND METHOD FOR DETERMINING THE ENVELOPE OF A MODULATED SIGNAL

(75) Inventors: David J. Krause, Nepean (CA); John C. Cartledge, Kingston (CA)

(73) Assignee: Queen's University at Kingston, Kingston (CA)

(*) Notice: Subject to any disclaimer, the term of this patent is extended or adjusted under 35 U.S.C. 154(b) by 15 days.

(21) Appl. No.: 13/282,779

(22) Filed: Oct. 27, 2011

(65) Prior Publication Data
US 2012/0140809 A1 Jun. 7, 2012

Related U.S. Application Data

(60) Provisional application No. 61/408,241, filed on Oct. 29, 2010.

(51) Int. Cl.
 *H04B 10/06* (2006.01)
 *H04B 17/00* (2006.01)
 *H04L 1/20* (2006.01)

(52) U.S. Cl.
 CPC ............ *H04B 17/0037* (2013.01); *H04L 1/206* (2013.01); *H04L 1/205* (2013.01)
 USPC ............................. 398/204; 398/202; 375/224

(58) Field of Classification Search
 None
 See application file for complete search history.

(56) References Cited

U.S. PATENT DOCUMENTS 6,782,211 B1* 8/2004 Core ............................. 398/205
7,529,481 B1* 5/2009 Doerr et al. ..................... 398/16
2007/0154221 A1* 7/2007 McNicol et al. .............. 398/135

OTHER PUBLICATIONS

Dorrer et al., "Measurement of eye diagrams and constellation diagrams of optical sources using linear optics and waveguide technology," Lightwave Technology, Journal of, vol. 23, No. 1, pp. 178,186, Jan. 2005.*
Gallion et al., "Quantum phase noise and field correlation in single frequency semiconductor laser systems," Quantum Electronics, IEEE Journal of, vol. 20, No. 4, pp. 343,349, Apr. 1984.*
C. Dorrer, C. R. Doerr, I. Kang, R. Ryf, J. Leuthold, and P. J. Winzer, "Measurement of eye diagrams and constellation diagrams of optical sources using linear optics and waveguide technology," J. Lightw. Technol., vol. 23, No. 1, pp. 178-186, 2005.
P.A. Williams, T. Dennis, I. Coddington, W.C. Swann, N.R. Newbury, "Vector signal characterization of high-speed optical components by use of linear optical sampling with milliradian resolution," IEEE Photon. Technol. Lett., vol. 20, No. 23, pp. 2007-2009, 2008.
I. Coddington, W. C. Swann, and N. R. Newbury, "Coherent linear optical sampling at 15 bits of resolution," Opt. Lett. vol. 34, No. 14, pp. 2153-2155, 2009.
C. R. S. Fludger, A. Voss, T. Duthel, C. Schulien, and B. Schmauss, "Characterization of an RZ-DQPSK transmitter using coherent detection," in Proc. European Conf. Optical Commun., Berlin, Germany, 2007, Paper P067.

(Continued)

*Primary Examiner* — Ken Vanderpuye
*Assistant Examiner* — Merlin Brito Peguero
(74) *Attorney, Agent, or Firm* — Ridout & Maybee LLP

(57) ABSTRACT

Systems and methods for determining the envelope of a modulated signal using high bandwidth and low bandwidth samples of a hybrid signal. The hybrid signal is obtained by mixing the modulated signal with its carrier signal. The systems and methods of the present disclosure may be suitable for equivalent-time or real-time oscilloscopes.

19 Claims, 8 Drawing Sheets

(56) References Cited

OTHER PUBLICATIONS

X. Liu and S. Chandrasekhar, "Measurement of constellation diagrams for 40-Gb/s DQPSK and 60-Gb/s 8ary-DPSK using sampled orthogonal differential direct-detection," in Proc. European Conf. Optical Commun., Berlin, Germany, 2007, paper 7.2.4.

M. Westlund, M. Sköld, and P. A. Andrekson, "All-optical phase-sensitive waveform sampling at 40 GSymbol/s," in Proc. Conf. Optical Fiber Commun., San Diego, CA, 2008, paper PDP12.

N4391A Optical Modulation Analyzer, data sheet available from Agilent Technologies (www.agilent.com).

Complex Spectral Analysis Principle, application note available from Apex Technologies (www.apex-t.com).

C. Dorrer, "Interferometric techniques for the characterization of temporal modulators," IEEE Photon. Technol. Lett., vol. 17, No. 12, pp. 2688-2690, 2005.

P. Gallion and G. Debarge, "Quantum phase noise and field correlation in single frequency semiconductor laser systems," IEEE J. Quantum Electron., vol. QE-20, No. 4, pp. 343-349, 1984.

K. Roberts, C. Li, L. L Strawczynski, M. O'Sullivan, and I. Hardcastle, "Electronic precompensation of optical nonlinearity," IEEE Photon. Technol. Lett., vol. 18, No. 2, pp. 403-405, 2006.

D. J. Krause, J. C. Cartledge, and K. Roberts, "Demonstration of 20 Gb/s DQPSK with a single dual-drive Mach-Zehnder modulator," IEEE Photon. Technol. Lett., vol. 20, No. 16, pp. 1363-1365, 2008.

* cited by examiner

SYSTEM AND METHOD FOR DETERMINING THE ENVELOPE OF A MODULATED SIGNAL

CROSS-REFERENCE TO RELATED APPLICATIONS

The present disclosure claims priority from U.S. provisional patent application No. 61/408,241, the entirety of which is hereby incorporated by reference.

TECHNICAL FIELD

The present disclosure relates generally to systems and methods for determining the modulating envelope of modulated signals. In particular, the present disclosure relates to systems and methods for determining the envelope of modulated signals where phase noise is present. The systems and methods of the present disclosure may be suitable for equivalent-time or real-time oscilloscopes.

BACKGROUND

Phase modulated signals such as binary phase shift keying (BPSK) and quadrature phase shift keying (QPSK) may be commonly used in optical communications. Techniques to measure the complex optical field of high bit rate signals have been considered. Examples of conventional techniques for obtaining the signal trajectory and constellation diagram include linear optical sampling [1]-[3], coherent detection and post-processing of real-time sampled waveforms [4]-[7], and complex spectral analysis [8].

Previously, an interferometric approach with real-time sampling has been demonstrated for low bandwidth signals under the assumption that the relative phase between two interfering signals is stable during the measurement time (100 ns) [9]. However, techniques that rely on real-time sampling may be limited by the bandwidth and sampling rate of the oscilloscope. For example, a conventional real-time sampling oscilloscope such as a Tektronix Digital Serial Analyzer 72004B may have bandwidth and sampling rate limits of 20 GHz and 50 GSample/s, respectively.

It would be useful to allow for determination of modulated signals without such restrictions.

SUMMARY

In some example aspects, the present disclosure provides systems and methods for measuring or determining a modulating envelope of a modulated signal, for example a modulated optical signal. For examples, disclosed methods and systems may use electrical and optical components and a high-bandwidth equivalent-time sampling oscilloscope, which may be the same as or similar to conventional components. In some examples, the system may include a signal modulator, a mixer (e.g., an optical mixer), and samplers for obtaining high bandwidth samples and low bandwidth samples. In some examples, an equivalent-time sampling oscilloscope with two low-speed (or low bandwidth) sampling modules (e.g., at 50 kHz) and two high-speed (or high bandwidth) optical sampling modules (e.g., at 65 GHz) may be used. Using the example system, the simultaneous measurement of four de-skewed (i.e., without relative time differences) signals may allow for the separate determination of the phase noise, amplitude and phase of the modulated signal. From these determined values, any amplitude and/or phase modulation of the modulated signal may be determined and the complete trajectory in time of the complex modulated signal may be constructed.

In some example aspects, there is provided a method for determining an envelope of a modulated signal, the method comprising: receiving at least two hybrid signals, the hybrid signals being obtained from mixing the modulated signal with a carrier signal, each of the hybrid signals having a phase noise difference that is a difference between phase noise of the modulated signal and phase noise of the carrier signal; obtaining a set of low bandwidth samples for each of the hybrid signals; obtaining a set of high bandwidth samples for each of the hybrid signals; determining the phase noise difference from the sets of low bandwidth samples; and determining the envelope of the modulated signal based on the determined phase noise difference, phase measurements of the sets of high bandwidth samples and amplitude measurements of the sets of high bandwidth samples, wherein the determination includes calculating for effects of the determined phase noise difference.

In some examples, the method may further comprise: receiving the modulated signal; and mixing the modulated signal with the carrier signal to obtain the at least two hybrid signals. For example, the method may further comprise receiving the carrier signal, or the mixing may further comprise determining the carrier signal from the modulated signal.

In some examples, determining the envelope may comprise determining phase and amplitude of the envelope of the modulated signal.

In some examples, the sets of low bandwidth samples and high bandwidth samples may be all substantially synchronized in time.

In some examples, measurements of the sets of high bandwidth samples may be taken over a time interval greater than a repetition cycle of the modulating signal.

In some examples, the phase noise difference may be due to a time delay between the modulated signal and the carrier signal. For example, the time delay may arise due to a propagation delay between the modulated signal and the carrier signal.

In some examples, the low bandwidth samples may be samples of the hybrid signal at a rate lower than a repetition rate of the modulated signal and the high bandwidth samples are samples of the hybrid signal at a rate higher than a repetition rate of the modulated signal. For example, the low bandwidth samples may be obtained at a rate in the range of about 1 Hz to about 100 kHz. For example, the high bandwidth samples may be obtained at a rate in the range of about 1 GHz to about 100 GHz, or about 1 GHz to about 100 THz or higher.

In some examples, the repetition rate of the modulated signal may be in the range of about 100 Hz to about 100 GHz, or about 1 GHz to about 100 THz or higher. For example, the repetition rate of the modulated signal may be in the range of about 100 Hz to about 100 kHz. For example, the repetition rate of the modulated signal may be in the range of about 1 GHz to about 40 GHz.

In some examples, the method may further comprise applying a time shift between the sets of high bandwidth samples to correct for any time difference between the sets of high bandwidth samples.

In some examples, the modulated signal may be an optical signal or an electromagnetic signal.

In some examples, the method may further comprise calculating adjustments for the determined envelope of the modulated signal to compensate for any known deviations in at least one of the modulated signal, the carrier signal and the hybrid signal.

In some examples, obtaining the sets of low bandwidth samples may comprise applying a bandpass filter to the hybrid signal, the bandpass filter having pass frequencies centered about an integer multiple of a repetition rate of the modulated signal.

In some examples, the method may further comprise: receiving timing information about the high bandwidth samples and the low bandwidth samples; and storing the timing information corresponding to the determined envelope of the modulated signal.

In some example aspects, there is provided a method for determining a phase noise difference between a modulated signal and a carrier signal, the method comprising: receiving at least two hybrid signals, the hybrid signals being obtained from mixing the modulated signal with a carrier signal, each of the hybrid signals having a phase noise difference that is a difference between phase noise of the modulated signal and phase noise of the carrier signal; obtaining a set of low bandwidth samples for each of the hybrid signals; and determining the phase noise difference from the sets of low bandwidth samples.

In some example aspects, there is provided a method for characterizing a modulator, the method comprising: receiving at least two hybrid signals, the hybrid signals being obtained from mixing a modulated signal from the modulator with a carrier signal, each of the hybrid signals having a phase noise difference that is a difference between phase noise of the modulated signal and phase noise of the carrier signal; obtaining a set of low bandwidth samples for each of the hybrid signals; and determining the phase noise difference from the sets of low bandwidth samples; and characterizing the modulator based on at least the determined phase noise difference.

In some examples, the method for characterizing may comprise: obtaining a set of high bandwidth samples for each of the hybrid signals; determining an envelope of the modulated signal from the sets of high bandwidth samples; and comparing phase and amplitude of the determined envelope with phase and amplitude of a desired envelope.

In some example aspects, there is provided a system for determining an envelope of a modulated signal, the system comprising: a first set of at least two samplers for obtaining a set of low bandwidth samples for each of two hybrid signals, the hybrid signals being obtained from mixing the modulated signal with a carrier signal, each of the hybrid signals having a phase noise difference that is a difference between phase noise of the modulated signal and phase noise of the carrier signal; a second set of at least two samplers for obtaining a set of high bandwidth samples for each of the hybrid signals; and a processor adapted to: determine the phase noise difference from the sets of low bandwidth samples; and determine the envelope of the modulated signal based on the determined phase noise difference, phase measurements of the sets of high bandwidth samples and amplitude measurements of the sets of high bandwidth samples, wherein the determination includes calculating for effects of the determined phase noise difference.

In some examples, the system may further comprise: a modulator for modulating the carrier signal to provide the modulated signal; and a mixer for mixing the modulated signal with the carrier signal to obtain the at least two hybrid signals. For example, the mixer may be an optical hybrid. In some examples, the system may further comprise a carrier source of providing the carrier signal to the mixer. In some examples, the carrier signal input to the mixer may be determined from the modulated signal.

In some examples, the system may further comprise at least two signal splitters for splitting each of the hybrid signals in two, for sampling by a respective one of the first set of samplers and a respective one of the second set of samplers.

In some examples, the processor may be further adapted to determine phase and amplitude of the envelope of the modulated signal.

In some examples, the first set of samplers may be low bandwidth samplers.

In some examples, the first set of samplers may be also capable of high bandwidth sampling.

In some examples, the system may further comprise an oscilloscope having the first set of samplers, the second set of samplers and the processor. For example, the oscilloscope may be an equivalent-time oscilloscope or a real-time oscilloscope.

In some examples, the system may further comprise a carrier source for providing the carrier signal.

In some examples, measurements of the sets of high bandwidth samples may be taken over a time interval greater than a repetition cycle of the modulating signal.

In some examples, the first set of samplers may have two samplers and the second set of samplers may have two samplers.

In some examples, the low bandwidth samples may be obtained at a rate or at an equivalent rate lower than a repetition rate of the modulated signal and the high bandwidth samples may be obtained at a rate or at an equivalent rate equal to or higher than a repetition rate of the modulated signal. For example, the sets of low frequency samples may be obtained at a rate in the range of about 1 Hz to about 100 kHz. For example, the sets of high frequency samples may be obtained at a rate in the range of about 1 GHz to about 100 GHz.

In some examples, the repetition rate of the modulated signal may be known beforehand or may be determined from the modulated signal. For example, the modulated signal may be periodic at the repetition rate, or the modulated signal may be aperiodic and its repetition rate may be known beforehand or determined from the modulated signal.

In some examples, the first and second sets of samplers may obtain the high and low bandwidth samples at a same real-time rate that is lower or higher than a repetition rate of the modulated signal.

In some examples, timing information about the low and high bandwidth samples may be recorded.

In some examples, the system may further comprise a time shift component to correct for any time difference between the sets of high bandwidth samples. For example, the time difference may arise from at least one of: a difference in signal path length between the sets of high bandwidth samples, an inherent time skew of the high bandwidth samplers, or an overall time skew of the system.

In some examples, the processor may be further adapted to calculate adjustments for the determined envelope of the modulated signal to compensate for any known deviations within the system.

In some examples, the system may further comprise a bandpass filter having pass frequencies centered about an integer multiple of a repetition rate of the modulated signal, and the sets of low bandwidth samples are obtained after applying the bandpass filter to the hybrid signals.

In some example aspects, there is provided a system for determining a phase noise difference between a modulated signal and a carrier signal of the modulated signal, the system comprising: a first set of at least two samplers for obtaining a set of low bandwidth samples for each of two hybrid signals, the hybrid signals being obtained from mixing the modulated signal with the carrier signal, each of the hybrid signals having a phase noise difference that is a difference between phase noise of the modulated signal and phase noise of the carrier signal; and a processor adapted to: receive the sets of low bandwidth samples; and determine the phase noise difference from the sets of low bandwidth samples.

In some example aspects, there is provided a system for characterizing a modulator, the system comprising: a first set of at least two samplers for obtaining a set of low bandwidth samples for each of two hybrid signals, the hybrid signals being obtained from mixing the modulated signal with the carrier signal, each of the hybrid signals having a phase noise difference that is a difference between phase noise of the modulated signal and phase noise of the carrier signal; and a processor adapted to: receive the sets of low bandwidth samples; determine the phase noise difference from the sets of low bandwidth samples; and characterize the modulator based on at least the determined phase noise difference.

In some examples, the system for characterizing may further comprise: a second set of at least two samplers for obtaining a set of high bandwidth samples for each of the hybrid signals; wherein the processor is further adapted to: determine an envelope of the modulated signal from the sets of high bandwidth samples; and compare amplitude and phase of the determined envelope with amplitude and phase of a desired envelope.

In some example aspects, there is provided a computer program product for determining an envelope of a modulated signal, the computer program product comprising a computer readable storage medium having computer executable instructions embedded thereon, the instructions, when executed, causing a processor to: receive at least two hybrid signals, the hybrid signals being obtained from mixing the modulated signal with a carrier signal, each of the hybrid signals having a phase noise difference that is a difference between phase noise of the modulated signal and phase noise of the carrier signal; obtain a set of low bandwidth samples for each of the hybrid signals; obtain a set of high bandwidth samples for each of the hybrid signals; determine the phase noise difference from the sets of low bandwidth samples; and determine the envelope of the modulated signal based on the determined phase noise difference, phase measurements of the sets of high bandwidth samples and amplitude measurements of the sets of high bandwidth samples, wherein the determination includes calculating for effects of the determined phase noise difference.

In some examples, the instructions further cause the processor to: receive timing information about the high bandwidth samples and the low bandwidth samples; and store the timing information corresponding to the determined envelope of the modulated signal.

In some example aspects, there is provided a use of the methods, systems and computer program products described above for characterizing a modulator, a modulated signal, or an envelope of the modulated signal.

In some examples, the modulator may be a Mach Zehnder modulator or an electro-absorptive modulator. For example, the modulator may be made of at least one of: gallium arsenide, indium phosphide and lithium niobate.

In some examples, the modulated signal may be a phase-shift keying (PSK) signal. For example, the PSK signal may be one of: a quadrature PSK signal, a binary PSK signal, a differential PSK signal, or a higher-order PSK signal.

In some examples, the modulated signal may be an amplitude modulated signal, a frequency modulated signal, or a quadrature amplitude modulated signal.

BRIEF DESCRIPTION OF THE DRAWINGS

Reference will now be made to the drawings, which show by way of example embodiments of the present disclosure, and in which.

DETAILED DESCRIPTION

Figure 1:
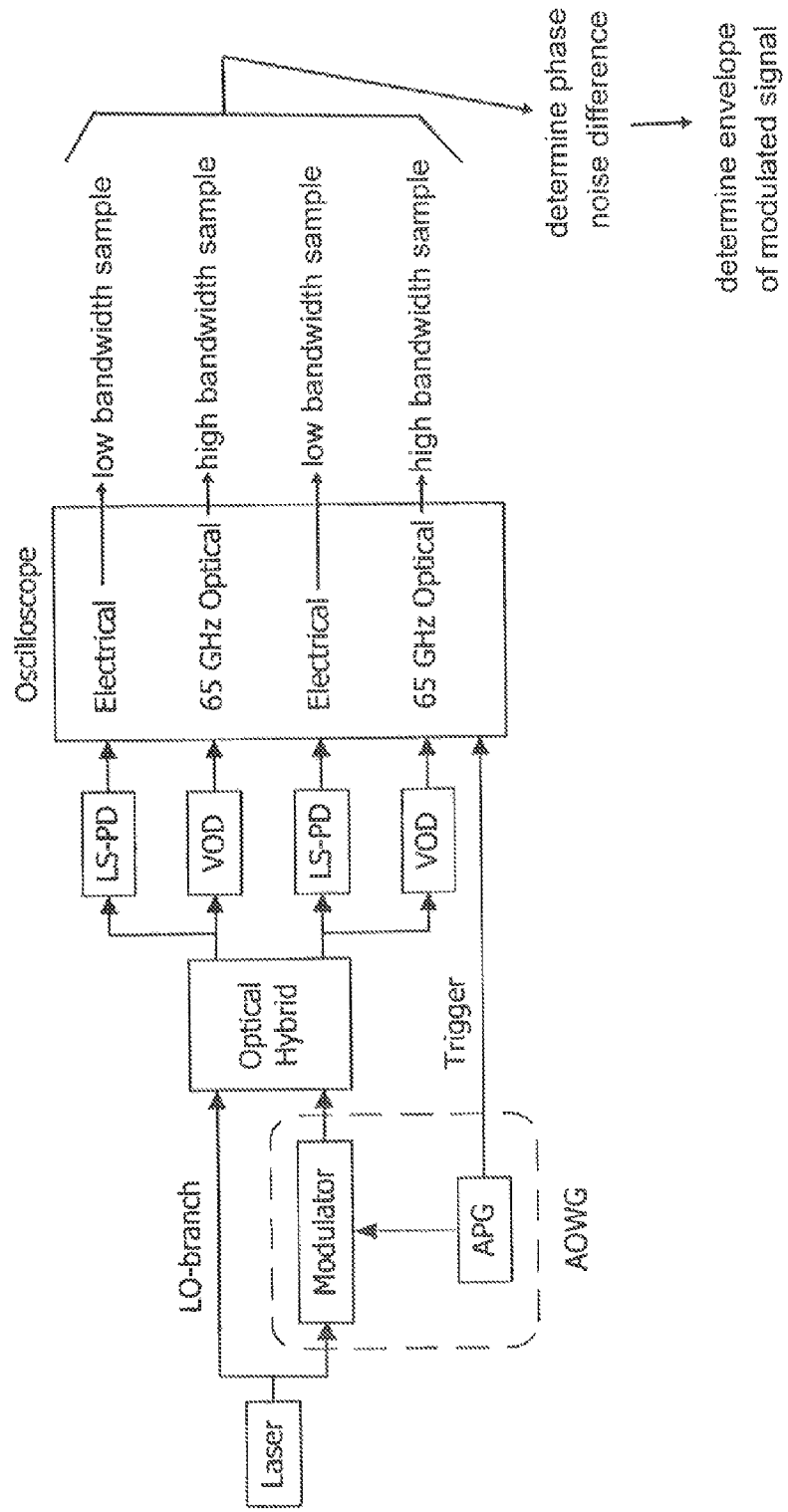
FIG. 1 shows a block diagram of an example system for determining an envelope of a modulated signal.

The present disclosure describes examples of systems and methods for determining an envelope of a modulated signal, for example a modulated optical or electromagnetic signal. The modulated signal may have in-phase and quadrature components, in some examples. In general, a carrier signal may be modulated by a modulating envelope, to produce the modulated signal. The envelope of the modulated signal may contain signal information in its phase and/or amplitude.

Such systems and methods may be implemented using electrical and/or optical components, which may be conventional components, which may include a high-bandwidth equivalent-time sampling oscilloscope, such as a conventional equivalent-time sampling oscilloscope. For a repeating signal (e.g., as in the case of a modulated signal), equivalent-time oscilloscopes typically obtain samples of a signal over multiple cycles of the same signal. Rather than attempting to take multiple samples of a single cycle of the signal in real-time (as may be the case with real-time sampling oscilloscopes), equivalent-time oscilloscopes may obtain samples from different points of the cycle, but over multiple cycles. For any one sample, the samplers may have very high bandwidths and may capture the signal relatively accurately. However, the actual time (which may be also known as the re-arm time for the sampler) between consecutive samples may be long compared to the repetition rate. This may be useful where the signal is a high bandwidth signal. For example, conventional real-time oscilloscopes may not be fast enough to sample a 10 GHz signal; however, an equivalent-time oscilloscope may sample multiple cycles of the 10 GHz signal and take those samples together, along with the timing information, to obtain samples that are equivalent to a very high rate of sampling. Thus, an equivalent-time oscilloscope may have an equivalent rate of sampling that is much higher than the actual rate of sampling.

Thus, equivalent-time sampling oscilloscopes may have relatively higher bandwidths than conventional real-time oscilloscopes. Using an equivalent-time oscilloscope to measure the modulated signal may allow for visualization, characterization and/or measurement of current and/or yet to be developed high-speed modulators. Although the present description describes the use of equivalent-time oscilloscopes, in some examples, such as where the modulated signal is relatively slow, a real-time oscilloscope may also be used.

Phase noise and/or thermal drift in a transmission system (e.g., from the carrier source itself) may cause rotation (i.e., phase noise) in the modulated signal trajectory in the complex plane. Using examples of the disclosed systems and methods, measurements of this rotation may be obtained from the signal samples detected with low bandwidth samplers, which may allow the effects of such rotation to be mitigated or removed from the signal samples detected with high bandwidth samplers.

In some examples, the present disclosure may be used for a single polarization signal (e.g., based on the available optical hybrid), but may be extended to a signal from a polarization diversity configuration. Although the present disclosure provides examples using optical signals, the methods and systems disclosed may also be used for other modulated signals, such as electromagnetic signals, for example where it may be more convenient or technologically necessary to detect the signal by means of mixing the modulated signal with a carrier signal.

A block diagram depicting an example system is shown in FIG. 1. This example system includes a carrier source (in this case a laser), a modulator and a mixer (in this case an optical hybrid), although in other examples the system may not include such components.

In some examples, the system may receive at least two hybrid signals. The hybrid signals may be obtained from mixing of the modulated signal and the carrier signal (e.g., using a mixer). Each of the modulated signal and the carrier signal may include phase noise, and the hybrid signals may include a phase noise difference that is the difference between the phase noise of the modulated signal and the phase noise of the carrier signal.

In the example of FIG. 1, the modulated signal may be provided by a modulator within an arbitrary optical waveform generator (AOWG) that modulates a carrier signal. In this example, the AOWG may include an arbitrary pattern generator (APG) and a modulator that modulates the signal according to the APG. In this example, the modulated signal is a modulation of a carrier signal, in this case a continuous wave (CW) signal provided by a carrier source, for example, a laser. The carrier signal, which may also be referred to as a local oscillator (LO), may be provided by any other suitable source. The modulated signal may thus include a modulating envelope (from the modulator) that modulates the carrier signal (from the carrier source). In the example of in FIG. 1, the carrier signal from the laser may be split into two branches, with the lower branch being modulated by the modulator to provide the modulated signal. In other examples, the system may not include the modulator and/or the carrier source.

In some examples, the carrier signal may be directly obtained from the carrier source (e.g., where the carrier source is accessible to or is part of the system). In some examples, where the system does not include the carrier source or where there is no independent carrier signal provided, the carrier signal used to produce the hybrid signal may be a suitable reproduction or simulation, which may be substantially the same as the true carrier signal. For example, a reproduction may be estimated from known characteristics of the modulated signal and/or the hybrid signals.

In the example of FIG. 1, the modulated signal and the carrier signal may be mixed in a signal mixer, in this example an optical hybrid. The mixer may produce at least two hybrid signals. Other types of mixers may be used, which may produce more than two hybrid signals, for example. Any type of suitable mixer may be used, according to the signals being mixed. For example, the mixer may be any suitable component that outputs product terms or non-linear terms from two or more input signals. In other examples, the system may not include the mixer but may instead receive the hybrid signals from an external source.

Each of the hybrid signals may be sampled by a respective one high bandwidth (or high-speed) sampler and a respective one low bandwidth (or low-speed) sampler. For example, there may be at least two high bandwidth samplers each sampling one of the at least two hybrid signals; and two low bandwidth samplers, each sampling one of the at least two hybrid signals.

In some examples, the system may additionally include signal splitters. Each signal splitter may each split one of the hybrid signals in two, to be sampled by a respective low bandwidth sampler and a respective high bandwidth sampler. In some examples, the signal splitters may be integrated with the mixer. Alternatively, the system may receive hybrid signals that are already split by an external component.

In the example of FIG. 1, there are two high bandwidth samplers and two low bandwidth samplers, for example using a four-channel equivalent-time sampling oscilloscope having at least two low-speed sampling modules and at least two high-speed sampling modules. In this example, the example oscilloscope may be a conventional equivalent-time sampling oscilloscope that includes two low-speed sampling modules (which may receive electrical inputs at about 50 kHz) and two high-speed sampling modules (which may receive optical inputs at about 65 GHz). As explained above, in the case of an equivalent-time oscilloscope, the high bandwidth samplers may be sampling at a high equivalent rate, rather than a high actual rate, in order to obtain the high bandwidth samples.

In some examples, rather than using low bandwidth samplers, low bandwidth samples may be obtained by passing high bandwidth samples through an appropriate low-pass filter. Alternatively, low bandwidth samples may be obtained using high bandwidth samplers, by selecting for sampling of only low frequencies. Thus, although low bandwidth samplers have been described, all samplers may in fact be capable of high bandwidth sampling. This may be useful where low-speed sampling modules are not available. In some examples, low-speed sampling modules may be more suitable, for example in order to reduce costs and/or to improve the signal-to-noise ratio.

Generally, a set of high bandwidth samples and a set of low bandwidth samples may be produced from each hybrid signal. For example, where there are two hybrid signals, this may result in a total of four samples—two sets of high bandwidth samples and two sets of low bandwidth samples.

In some examples, more than two high bandwidth samplers and more than two low bandwidth samplers may be used, for example where there are more than two hybrid signals (such as where the mixer is a balanced hybrid with four outputs) or where redundant samples are desired, such as for error-checking.

In some examples, the high bandwidth samplers may be configured to obtain samples at a bandwidth that is equal to or higher than the repetition rate of the modulated signal. Similarly, low bandwidth samplers may be configured to obtain samples at a bandwidth that is lower than the repetition rate of the modulated signal. In general, the low bandwidth samplers may be suitably fast to measure the phase noise of the carrier signal (which may be known beforehand, from characterization of the carrier source, for example). In general, the high bandwidth samplers may be suitably fast to measure the spectral content of the modulated signal (e.g., ten times the repetition rate of the signal or higher), for example at least higher than the Nyquist frequency of the signal. For example, the high bandwidth samples may be obtained at a suitably high frequency sampling rate suitable for capturing the desired information from the modulated signal (e.g., based on conventional calculations of the expected signal). In some examples, only certain frequencies of the modulated signal may be of interest, and the high frequency sampling rate may be chosen accordingly to determine characteristics of the modulated signal at only the frequencies of interest. For example, to determine information about the modulated signal only in a lower bandwidth region, a lower sampling rate may be used for the high bandwidth samples; conversely, to determine information about the modulated signal in a high bandwidth region, a higher sampling rate may be used for the high bandwidth samples. Typically, the repetition rate of a modulated signal may be known beforehand, and may be at least twice the linewidth of the carrier source.

For example, a modulated signal may have a repetition rate in the range of about 100 Hz to about 100 GHz, or about 1 GHz to about 100 THz or higher. For example, the repetition rate of the modulated signal may be between 100 kHz and 100 GHz, between about 100 Hz to about 100 kHz, or between about 1 GHz to about 40 GHz, or any other sub-range. The modulated signal may have any repetition rate higher or lower than the rates described. For example, a higher quality or faster modulator may produce a modulated signal with a repetition rate higher than 40 GHz. Current or future developments in modulators may give rise to modulated signals with much higher repetition rates.

The sampling rates (or equivalent rates in the case of equivalent-time oscilloscopes) of the low bandwidth and high bandwidth samplers may be configured according to the repetition rate of the modulated signal. For example, for a 100 Hz modulated signal, low bandwidth samplers may sample in the range of about 1 Hz to about less than 100 Hz and high bandwidth samplers may sample in the range of about 1 MHz to about 1 GHz or higher. For example, for a 1 GHz modulated signal, low bandwidth samplers may sample in the range of about 1 kHz to about 100 kHz and high bandwidth samplers may sample in the range of about 10 GHz to about 100 GHz or higher. For an example modulated signal having a repetition rate of about 10 MHz, sampling with an equivalent-time sampling oscilloscope having low-speed sampling modules at about 50 kHz bandwidth and high-speed sampling optical modules at about 65 GHz bandwidth may be suitable. Generally, the low bandwidth samples may be obtained at a bandwidth much lower than the repetition rate of the modulated signal, such as half the repetition rate; and the high bandwidth samples may be obtained at a bandwidth much higher than the repetition rate of the modulated signal, such as ten times the repetition rate. These bandwidth ranges are provided for the purpose of illustration only, and other suitable bandwidth ranges may be used.

In the example of FIG. 1, a low-speed photodiode (LS-PD), for example a 50 kHz bandwidth photodiode, may be used to convert the hybrid optical signals to electrical signals for sampling by the low-speed sampling modules. In other examples, low bandwidth samples may be obtained directly from the hybrid optical signals, without conversion to electrical signals, and the LS-PD may be omitted. In some examples, the low bandwidth samples may be obtained by low-pass filtering of the high speed signal. Alternatively, the hybrid signals may already be electrical or electromagnetic, and no conversion to electrical signals may be required.

In some examples, a signal time shift component, such as an optical delay, may be introduced for each of the high bandwidth samples, in order to remove any time delay (i.e., de-skew) between the high bandwidth samples. In the example of FIG. 1, a variable optical delay (VOD) component may be provided to the signals sampled by the high-speed sampling modules. The signal delay component may be used to correct for any time difference, which may be due to propagation delays arising from: signal path length differences between the two high bandwidth sample paths, internal delays of the samplers and/or the oscilloscope, signal path through system components, and/or overall time skew of the system. In some examples, the signal delay may be implemented electrically, such as with a tunable delay element, for example a phase shifter may be used after the photo detector but before the high bandwidth sampler. In some examples, such as where signal path length difference is negligible, the time delay correction may not be necessary and the delay component may be omitted.

Generally, the sampled signals may be substantially synchronized in time and may be measured substantially simultaneously. The phase noise difference may be determined and taken into account (e.g., corrected for using appropriate calculations) when determining the envelope of the modulated signal. The amplitude and phase of the envelope may be determined, and accordingly the amplitude and/or phase modulation of the signal. Thus, the trajectory in time of the modulated signal may be constructed (e.g., using suitable calculations).

In the example of FIG. 1, the sampling by the oscilloscope may be triggered using a trigger signal from the AOWG. In other examples, for example where the trigger signal is unavailable (e.g., in long-range transmission), the trigger signal may be derived from the hybrid signal (e.g., using suitable calculations). The trigger signal may be useful for substantially synchronizing the samples in time and may allow for determination of the relative time point of each sample. In other examples, such as where an oscilloscope is not used, a trigger signal may not be required. Other methods of signal synchronization and/or determining the time dependence of the signals may be used.

In some examples, the modulated signal may be periodic or aperiodic. Where the modulated signal is aperiodic, a suitable trigger signal related to the modulated signal may be used or derived from the modulated signal. For example, if the modulated signal is a modulated bit stream, the trigger signal may be at the symbol rate, or the symbol rate divided by 16, or any other suitable trigger rate.

Example equations and calculations are now discussed. These equations and calculations are provided to assist in understanding the disclosure, and are not intended to be limiting.

In the example of FIG. 1, the envelope of the optical signal from the carrier, in this case the laser, may be described as $$E(t)=A\exp(j\phi_n(t)) \quad (1)$$

where A is the amplitude and $\phi_n(t)$ is the random process that describes the phase noise in the carrier. The modulated signal that is output from the modulator and received at the input to the mixer (in this example the optical hybrid) may be described as $$E_{mod}(t)=M(t)\exp(j(\theta(t)+\phi_n(t))) \quad (2)$$

where M(t) is the amplitude modulation and θ(t) is the phase modulation from the modulating envelope. Both M(t) and θ(t) may be periodic (e.g., bit patterns with repetition rates of 10 MHz in this example). In some examples, the modulated signal may have only phase modulation (i.e., M(t) is a constant) or only amplitude modulation (i.e., θ(t) is a constant). The output signal from the carrier source (LO branch) received at the input to the mixer may be described as $$E_{LO}(t)=B\exp(j\phi_n(t-\tau)) \quad (3)$$

where B is the amplitude and τ is the time delay relative to $E_{mod}(t)$ due to the different path lengths traveled by the carrier signal and the modulated signal (in this example, the LO branch may be a reproduction or simulation of the carrier signal that was applied to the input of the modulator). The time delay τ may give rise to a phase noise difference, as will be described further below. In theory, it may be possible to reduce or eliminate the time delay between the carrier signal and the modulated signal arriving at the mixer, with the result that the phase noise difference may be negligible or zero.

In practice, it may be difficult or impossible to reduce or eliminate this time delay. For example, with fiber pigtailed devices (e.g., with each component path length on the order of meters), it may be difficult or undesirable (e.g., in a high-volume testing environment) to completely remove the difference in path lengths between the signal path of the carrier signal (i.e., the LO branch in the example of FIG. 1) and the signal path of the modulated signal (i.e., the modulator branch in the example of FIG. 1), and so this difference may be carried forward in the example analysis. For example, for a laser carrier source having a linewidth on the order of a few megahertz, the path length difference may be up to about 10 meters, giving rise to a corresponding time delay on the order of several nanoseconds. Other path length differences may be found in other systems, resulting in corresponding time delays.

The electric fields at the output ports of the hybrid may be provided in two components, which may be described as $$E_{p1}(t)=\gamma_{1,mod}E_{mod}(t)+\gamma_{1,LO}E_{LO}(t) \quad (4)$$

$$E_{p2}(t)=\gamma_{2,mod}E_{mod}(t)+\gamma_{2,LO}E_{LO}(t). \quad (5)$$

The different attenuations through the mixer are given by $\gamma_{i,LO/mod}$, where i=1 indicates the first hybrid signal and i=2 indicates the second hybrid signal, mod indicates the modulated signal component and LO indicates the carrier signal component. In general, the attenuations $\gamma_{i,LO/mod}$ may be characteristic of the mixer used for generating the hybrid signals, and may or may not be interrelated. In some examples, the attenuations may be all equal.

When the electric fields are detected, the corresponding photocurrents to be sampled (e.g., by the equivalent-time sampling oscilloscope) may be described as $$i_{p1}(t)=\gamma_{1,LO}^2|B|^2+\gamma_{1,mod}^2M^2(t)+\ldots 2\gamma_{1,mod}\gamma_{1,LO}M(t)B\times\ldots\cos(\theta(t)+\phi_n(t)-\phi_n(t-\tau)) \quad (6)$$

$$i_{p2}(t)=\gamma_{2,LO}^2|B|^2+\gamma_{2,mod}^2M^2(t)+\ldots 2\gamma_{2,mod}\gamma_{2,LO}M(t)B\times\ldots\sin(\theta(t)+\phi_n(t)-\phi_n(t-\tau)). \quad (7)$$

The equations for the photocurrents may be considered to be a superposition of three terms. The first term may be related to the average power of the carrier signal. The second term may be related to the amplitude modulation (i.e., $M^2$(t)) of the modulated signal, and the third term may be related to the electric field of the modulated signal. Ignoring the first two terms of equations (6) and (7), one can see that the measurement is of the envelope, and that the two measurements are orthogonal (or substantially orthogonal with a laboratory hybrid).

In some examples, the mixer may be a balanced optical hybrid, in which case the first two terms of equations (6) and (7) may be zero, or near zero (depending on the quality of the balance).

Each photocurrent may be detected using a high bandwidth sampler and a low bandwidth sampler. For example, detection may be carried out using a four-channel equivalent-time sample oscilloscope. As described above, the number of high and low bandwidth samplers may be more or less than two each, depending on the application. For example, as in conventional equivalent-time oscilloscopes, the samplers may have relatively high bandwidths (e.g., 65 GHz), but relatively low real-time sample rates (e.g., 1000 samples per second).

In the example of FIG. 1, the output hybrid signals from the mixer may be split to provide the separate high- and low-speed sampling modules of the oscilloscope. Splitting of the hybrid signals may be done using any suitable signal splitter including, for example, digital or analog splitters, electrical or optical splitters, and passive or active splitters. This signal split may be unequal, for example to provide the sampling modules with suitable signal-to-noise ratios and/or signal strengths, and/or split based on the availability of standard industry components. In this example, the first hybrid signal, obtained from the first port of the mixer, may be split using a 99:1 optical splitter. The 99% portion may be detected with a high-speed sampling module (e.g., having a bandwidth of about 65 GHz), in order to improve the signal-to-noise ratio of the high bandwidth samples. The 1% portion may be detected with a low-speed module (e.g., having a bandwidth of about 50 kHz), for example where the signal-to-noise ratio is not as critical. The setup for sampling the second the hybrid signal may be similar.

In some examples, the hybrid signals may be evenly split and provided to the samplers. In some examples, there may be other signal processing performed on the hybrid signals before being sampled by the samplers. For example, the hybrid signals may be amplified to improve the signal-to-noise ratio. In some examples, suitable calculations may be performed on the hybrid signals to correct for any known deviations or error characteristics of the mixer (e.g., where the outputs from the mixer are not purely orthogonal signals).

Determination of Phase Noise

The low bandwidth samples obtained by the low-speed modules may be used to measure the phase noise difference (i.e., $\phi_n(t)-\phi_n(t)$). When sampled at a low bandwidth (i.e., a bandwidth lower than the repetition rate of the modulated signal), the first term in (6) and (7) may be a DC signal (i.e., the average power of the carrier signal). The second term in (6) and (7) may be considered as a low-pass filtered version of the amplitude modulation $M^2$ (t). When the low-speed sampling (and hence the low-pass filter) bandwidth is below the repetition rate (or frequency) of the modulated signal, the second term may be proportional to the average power of the modulated signal. The third term of (6) may be proportional to a low-pass filtered version of $$M(t)\cos(\theta(t)+\phi_n(t)-\phi_n(t-\tau)) \quad (8)$$

which may be the same as, $$\Re\{M(t)\exp(j(\theta(t)+\phi_n(t)-\phi_n(t-\tau)))\} \quad (9)$$

where $\Re$ is the real part of the modulated signal (i.e., the in-phase portion). Expanding the modulation using a Fourier series yields, $$\Re\left\{\exp(j(\phi_n(t)-\phi_n(t-\tau)))\cdot\sum_{n=-\infty}^{\infty}M_n\exp(j(2\pi nf_r t+\theta_n))\right\} \quad (10)$$

where $M_n$ and $\theta_n$ are the coefficients of the complex Fourier series, and $f_r$ is the repetition rate of the signal modulation. While $\exp(j\phi_n(t))$ may have a bandwidth of several megahertz depending on the carrier linewidth, for example path length differences (e.g., on the order of 10 m), the bandwidth of $\exp(j(\phi_n(t)-\phi_n(t-\tau)))$ may be relatively small.

Figure 2:
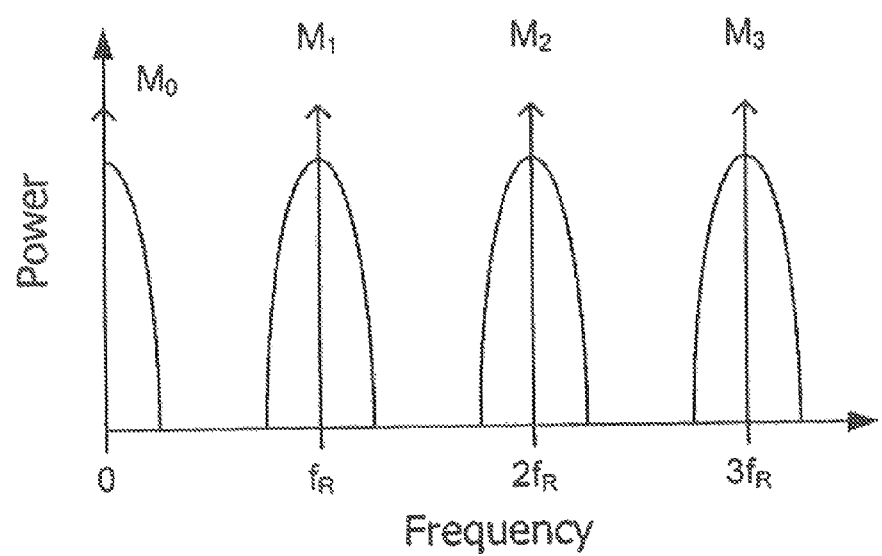
FIG. 2 shows an example spectrum of the phase noise difference about the Fourier coefficients for an example modulated signal within an example system.

FIG. 2 provides an example frequency spectrum for an example hybrid signal. This example frequency spectrum shows the total phase modulation, including the phase noise difference. In the example of FIG. 2, the coefficients $M_n$ are depicted at frequencies $nf_r$, n=0, 1, 2, 3, and the spectrum of $\exp(j(\phi_n(t)-\phi_n(t-\tau))$ about each of them. The frequency content about each of the Fourier components may be determined by the phase noise and the path length difference $\tau$; a decrease in the phase noise or path length difference may reduce the spectral bandwidth. Typically, the larger the $\tau$, the wider the spectra about $nf_r$. Therefore, after low-pass filtering the third term of the photocurrent is approximately, $$\Re\left\{\exp(j(\phi_n(t)-\phi_n(t-\tau)))M_0\exp(j\theta_0)\right\}. \quad (11)$$

Since $M_0\exp(j\theta_0)$ may be a fixed constant, the frequency of the low bandwidth samples of the real part of the hybrid signal may provide a direct measurement of the real part (i.e., in-phase component) of the phase noise difference of the modulated signal, from the frequency spectrum. Similarly, from (7), the imaginary part (i.e., the quadrature component) of the phase noise difference of the modulated signal may be measured from the frequency of the low bandwidth samples imaginary part of the hybrid signal. With these two measurements, the phase noise difference may be determined and may thus be accounted for in determining amplitude and phase of the envelope of the modulated signal. In some examples, where the modulated signal is aperiodic, the modulated signal may still have a fixed value at low frequency (such as where the modulated signal is an AC coupled bit stream with a DC offset added), in which case the phase noise difference may still be measured using the example techniques described here.

In some examples, such as in carrier-suppressed modulation formats, a small imbalance in the number of ones in the bit patterns for the in-phase and quadrature components of the modulated signal may increase the value of $M_0$, which may aid the measurement of the phase noise difference by facilitating the measurement of the frequency spectrum at low frequencies. In some examples, instead of a low-pass filter, a band-pass filter may be used to determine the phase noise difference from an n≠0 term in (10). In some examples, a band-pass filter may be used in addition to a low-pass filter, for example where redundancy is desired for error-checking purposes.

The lower limit on the repetition rate of the modulated signal, $f_r$, may be determined by being able to separate the n=0 term in (10), for example as illustrated in FIG. 2. For example, the repetition rate may not be so low as to allow overlap of the frequency spectra. For the low bandwidth samples, a high-order, low-pass response with appropriate bandwidth may allow for the smallest possible values of $f_r$. In some examples, such as in a fibered measurement system, thermal drift between the signal paths of the carrier signal and the modulated signal may contribute to the phase noise.

Since example equivalent-time oscilloscopes may require measurement times on the order of seconds (and possibly longer if averaging of measurements is used), phase noise in the system may have a detectable effect on the signal measured by the oscilloscope, and hence measurement of the phase noise difference, for example as described above, may be useful for determining the phase modulation of the modulated signal.

Determination of Amplitude Modulation

The amplitude modulation, as represented by $M^2(t)$, may be determined by taking a plurality of amplitude measurements of the high bandwidth samples over a predetermined time interval. The predetermined time interval may be a time interval longer than a repetition period of the modulated signal, at least sufficient for the phase terms of equations (6) and (7) to average out to zero. The mean value, over a period greater than the repetition time of the modulated signal, of the third term in the photocurrent equations (6) and (7) is zero because the $\cos(\theta(t)+\phi_n(t)-\phi_n(t-\tau))$ and $\sin(\theta(t)+\phi_n(t)-\phi_n(t-\tau))$ functions and fluctuations in $\phi_n(t)-\phi_n(t-\tau)$ (e.g., phase noise due to the thermal drift between the carrier signal and the modulated signal and/or due to inadvertent vibration of the components) has an average value of zero over a relatively long time interval (e.g., longer than a repetition period of the modulated signal). By averaging the high-speed samples obtained over the predetermined time interval, the third term in (6) and (7) may be zeroed out and $M^2(t)$ may be determined from the remaining terms (e.g., using suitable calculations).

For example, amplitude measurements of the high bandwidth samples may be taken for 128 samples sampled from a time interval equal to two or more repetitions of the modulated signal. Generally, the repetition time of the modulated signal may be known and the appropriate time interval for averaging amplitude measurements may be determined accordingly. In some examples, the respective levels of the carrier signal and the modulated signal contributing to the hybrid signal may be adjusted to reduce the contribution of the amplitude modulation terms in equations (6) and (7). In such examples, the amplitude modulation in these measurements may be ignored, possibly at the expense of an increase in measurement error.

Determination of Phase Modulation

Since the measured phase of the hybrid signals may include the effects of the phase noise difference, after the phase noise difference has been determined (e.g., as described above), calculations may be made to account for its effects when determining the phase modulation.

In some examples, such as where an equivalent-time oscilloscope is used to obtain high and low bandwidth samples of the hybrid signal at substantially the same time, time shift or skew (e.g., on the order of hundreds of picoseconds) between the low bandwidth samples and the high bandwidth samples may not be significant, as the low bandwidth samples may have relatively low bandwidths in comparison to the time shift (e.g., on the order of a few kilohertz). However, where there are two or more high bandwidth samplers, any time shift between the high bandwidth samplers may affect the measurements of the phase.

In the example system of FIG. 1, the skew between the high-speed modules may be removed using two variable optical delay (VOD) lines. Removing the skew using post-processing software after detection may not be suitable because the high-bandwidth oscilloscope uses equivalent-time sampling. In an equivalent-time oscilloscope, while the samples are plotted on the oscilloscope sequentially, adjacent samples are captured at different times. That is, a new sample may be captured after each pattern trigger (in some cases, several trigger events could be ignored while the oscilloscope trigger re-arms). In this example, the traces for the four measured signals at the oscilloscope may be obtained by using the AOWG to trigger the oscilloscope. Consequently, samples may be separated in time by several milliseconds even though they are displayed on the oscilloscope with a spacing of a few picoseconds. After several milliseconds, the random phase noise difference would have changed and so the sample information on one channel may be no longer correlated to that on the other.

In this example, the measurement technique described above (e.g., using VODs) may accommodate the sampling rate limitation caused by the re-arming time of a high bandwidth, sampling oscilloscope and may not be dependent on the specific sampling rate. In some examples, other methods of matching the sampling to a time point may be used instead of a trigger signal.

Determination of in-phase and quadrature components

With the determination of the phase noise difference terms ($\cos(\phi_n(t)-\phi_n(t-\tau))$ and $\sin(\phi_n(t)-\phi_n(t-\tau))$), the determination of the intensity modulation $M^2(t)$, the skew removed from the high-speed modules, and suitable calibrations to determine the attenuation through the optical hybrid, the amplitude and phase of the in-phase and quadrature of the modulating envelope may be determined at any sampling instance displayed on the oscilloscope. Any suitable calculations may be used. For example, equations (6) and (7) can be considered as a system of two equations in the two unknowns $M(t)\cos(\theta(t))$ and $M(t)\sin(\theta(t))$, and may be solved accordingly.

In some examples, the levels of the carrier signal and modulated signal contributing to the hybrid signal may be adjusted so that measurement of the intensity modulation may not be necessary. In such examples, not measuring the intensity modulation may contribute a relatively small measurement error which may be acceptable, depending on the application.

Further Processing

In some examples, there may be further processing or calculations of the determined envelope. For example, the system or parts of the system may be known to introduce errors. This may be determined by calibration of the system and/or its parts prior to receiving the modulated signal. For example, through calibration, the mixer may be known to generate unbalanced hybrid signals, such that rather than each output hybrid signal being described purely by a respective one of equations (4) and (5), each hybrid signal is described by an algebraic combination of equations (4) and (5). In another example, through calibration, the samplers may be known to have attenuation at certain frequencies. When such error characteristics are known, they may be corrected for using suitable post-processing calculations on the determined envelope. Alternatively, such corrections may be carried out on the high and low bandwidth samples prior to determination of the envelope.

Characterization

In some examples, the disclosed systems and methods may be used to characterize system components, such as the carrier source and/or the modulator. Characterization may include comparing the obtained results to desired or intended results. Calculations may also be made to determine the noise or variance of components, such as the carrier source, for example as described below.

The low bandwidth samples may be summed to form the complex process, $$M_0 \exp(j\theta_0)\exp(j(\omega_0\tau_0))\exp(j\Delta\phi_n(t,\tau)) \quad (12)$$

where $M_0$ and $\theta_0$ are the coefficients of the complex Fourier series for the periodic modulation, $\omega_0$ is the optical center frequency of the laser, $\tau$ is the delay (in time) between the carrier and modulated signal branches, and $\Delta\phi_n(t,\tau)=\phi_n(t)-\phi_n(t-\tau)$ is the random process for the laser phase noise difference. In this example, the first exponential does not vary with time. The second exponential in this example varies slowly (e.g., due to temperature variation which may cause differential expansion and contraction of the fibers, and/or drift of the center frequency). Both of these may be assumed to be changing very slowly and may be tracked by the detectors.

An example statistical description of the last term involving the laser phase noise difference may be found in [10]. For small bandwidth detectors the random process may be low-pass filtered and replaced by its expectation, which is a real number with an angle of zero. This means that the high-speed measurements may have an error associated with the angle which is approximately given by $\Delta\phi_n(t,\tau)$. The error may be a zero-mean random process, which may allow for averaging of the measured points. The variance of the error may be a function of the laser linewidth and path length difference, which may be described as $$\langle \Delta\phi_n^2(\tau)\rangle = \tau 2\pi f_{lw} = \frac{\Delta L_{pl}}{v_g} 2\pi f_{lw} \quad (13)$$

where $f_{lw}$ is the full-width half-maximum linewidth (in Hz), $\Delta L_{pl}$ is the path length difference, and $v_g$ is the group velocity of light in the fiber.

For an example carrier source, such as a tunable, external cavity laser with a linewidth of 100 kHz, a path length difference of 10 m may yield a variance of error of about $0.01\pi$.

Example Studies

An example study implementing an example of the systems and methods described above is now disclosed. This example is for the purpose of illustration only and is not intended to be limiting.

In this example, an arbitrary optical waveform generator (AOWG) (for example as described in [11]) may be used to generate a 20 Gb/s quadrature phase-shift keying (QPSK) signal using a single dual-drive Mach-Zehnder modulator (for example as described in [12]). This example setup may require multi-level signals to drive the modulator. In this example, the AOWG may include an optical modulator driven by high-speed electrical signals from a two-channel arbitrary pattern generator. The arbitrary pattern generator may have a sampling rate of 20 GSample/s and 6-bit digital-to-analog converters. This may allow for the independent control of the magnitude and phase of the output signal from the modulator, and thus for the generation of arbitrary optical waveforms. In this example, the linewidth of the external cavity laser was 100 kHz. The delay r was about 0.5 ns; the optical components in the interferometer were measured and a suitable patch cord was used to obtain a path length difference of less than 10 cm. In this example, variable optical delays with delays of ±50 ps may be used to remove the skew between the high-speed modules.

Figure 3:
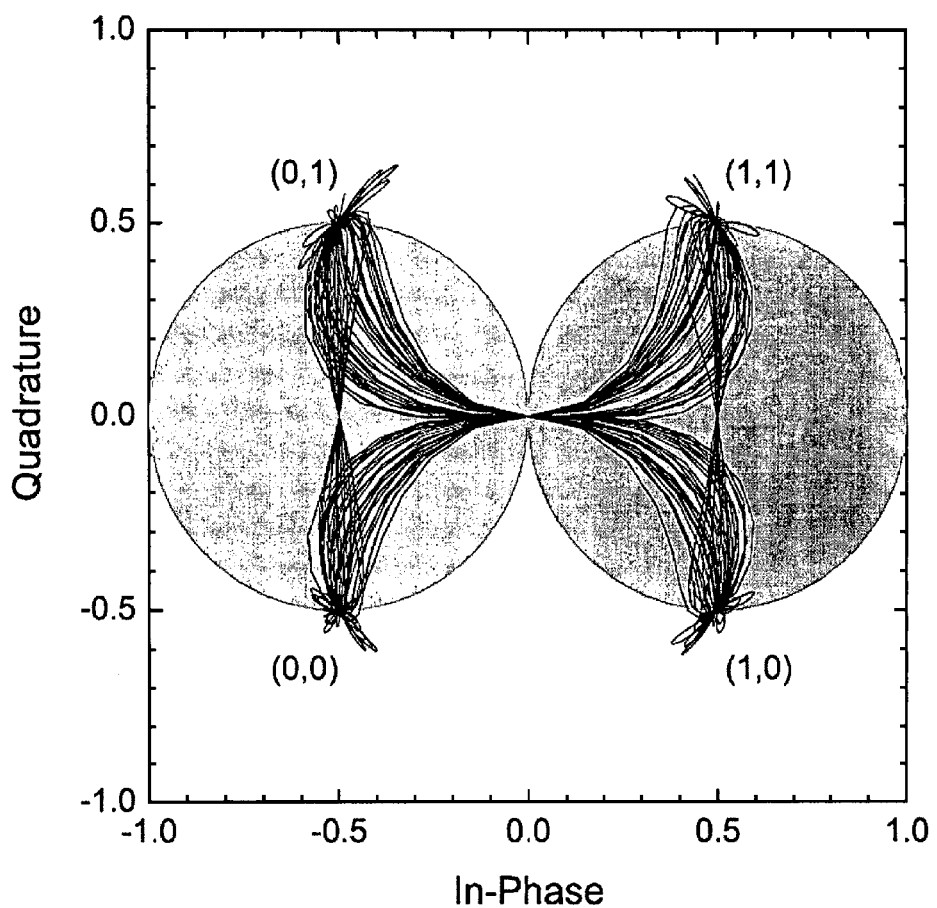
FIG. 3 shows an example calculated trajectory of an example normalized signal in the complex plane.

For an example dual-drive Mach-Zehnder modulator biased at extinction and peak-to-peak RF drive voltages of $V_\pi$, the accessible region of the complex plane is shown by the gray shaded region in FIG. 3 for an example 20 Gb/s QPSK signal obtained with the example dual-drive Mach-Zehnder modulator.

$V_\pi$ is the voltage required to change the phase of the signal in an arm of the modulator by $\pi$ radians. During one symbol (e.g., of duration 100 ps), the first sample generated may correspond to the electric field associated with the symbol. In this example, the second sample was used to shape the signal trajectory in accordance with the constraint indicated in FIG. 3. To select the value for the second sample, the next symbol was examined to determine the necessary transition. For a repeated symbol, the second sample was a repeat of the first. For horizontal and diagonal transitions (in this example, (0,1) to (1,1) or (0,0) to (1,1)), the second sample was set to the origin. For vertical transitions (in this example, (1,0) to (1,1)), the second sample was set to ±0.5+j0. Simulation results for the signal trajectory are also shown in FIG. 3. In this example, the digital-to-analog conversion causes the RF drive voltages to occasionally exceed $V_\pi$, in which case the optical field extends outside the gray shaded region.

Figure 4:
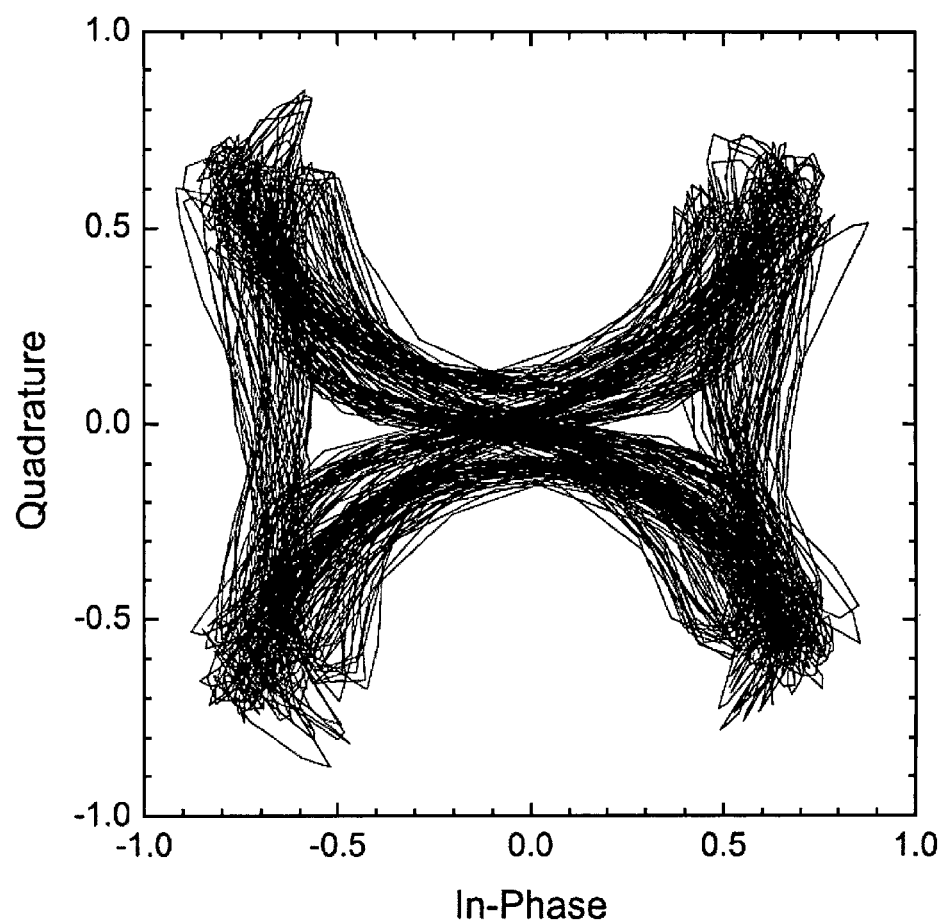
FIG. 4 shows an example measured trajectory of an example normalized signal in the complex plane.

An example of the measured trajectory for the 20 Gb/s QPSK signal obtained with the dual-drive Mach-Zehnder modulator of this example, with a $2^9$ symbol sequence, is shown in FIG. 4 in the complex plane.

Figure 5:
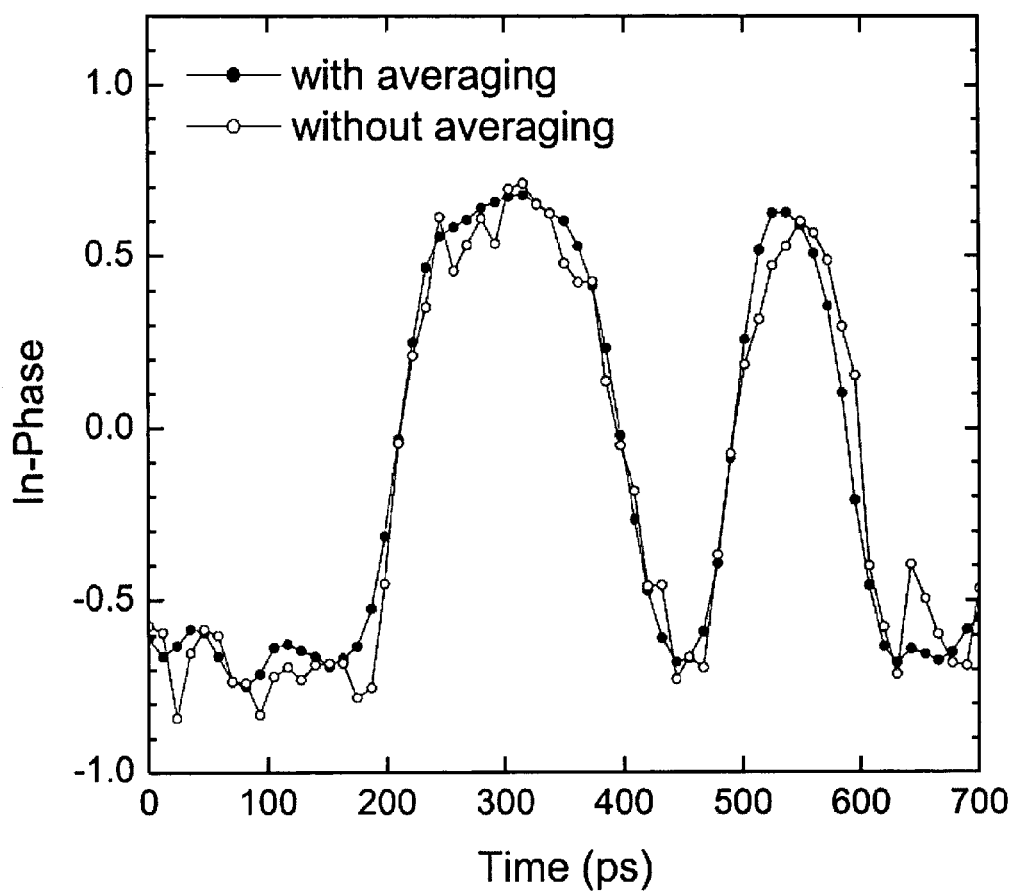
FIG. 5 shows an example plot illustrating the in-phase portion of an example signal with and without averaging.

Since ideal QPSK is carrier suppressed (i.e., $M_0$=0), in this example the number of ones for the I channel was 266 and the number of ones for the Q channel was 245. The non-ideal responses of the digital-to-analog converters and drive amplifiers may lead to a pattern dependence in the multi-level drive signals. This may cause the broad rails in the eye diagram, which may be consistent with the signal trajectory shown in FIG. 4. In this example, the setup may be stable, and so averaging of signals over a plurality of signal repetitions may be applied to the trajectories to reduce the impact of oscilloscope noise. An example of the measured in-phase signal is shown in FIG. 5 for seven symbol periods with and without averaging (in this example, of 128 traces).

Figure 6:
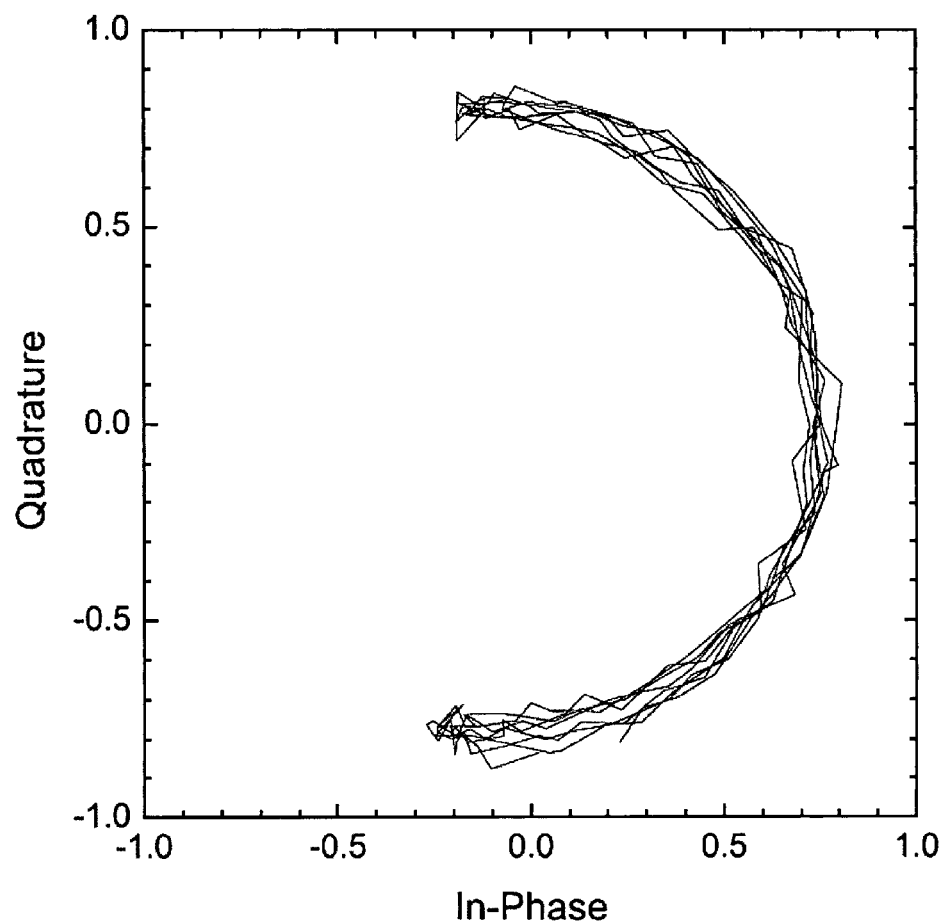
FIG. 6 shows an example measured signal trajectory in the complex plane of an example phase modulated signal.
Figure 7:
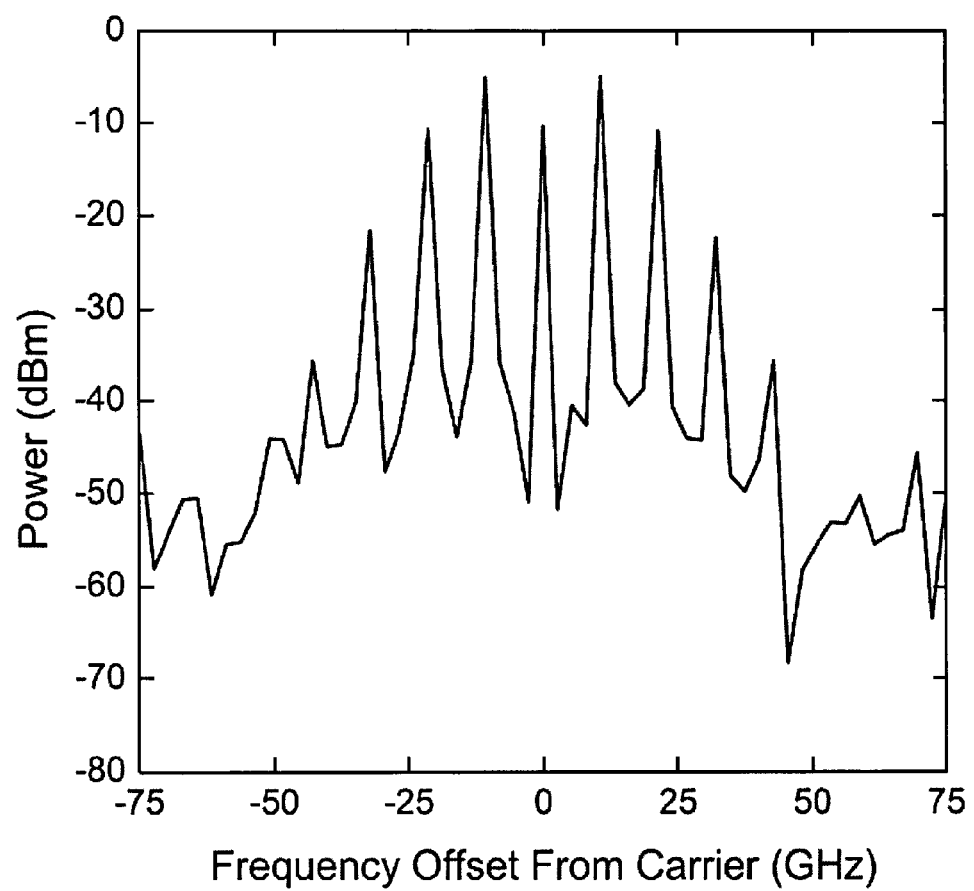
FIG. 7 shows an example calculated optical spectrum from example measured in-phase and quadrature data for an example modulated optical signal.
Figure 8:
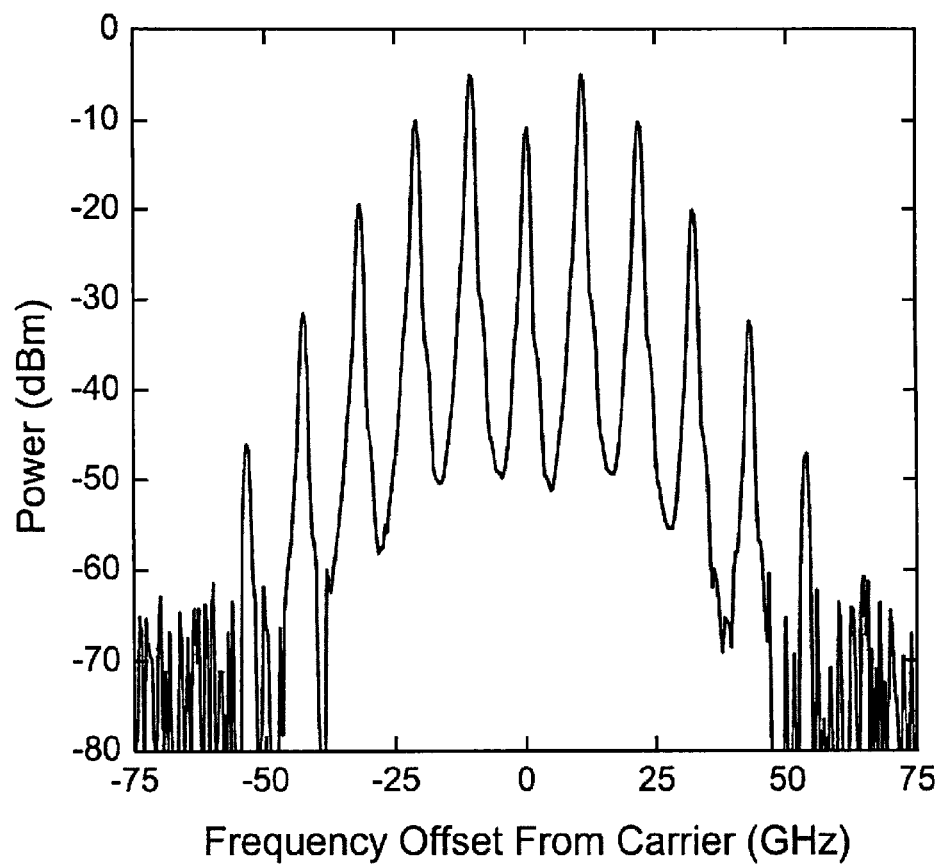
FIG. 8 shows an example measured optical spectrum for the example modulated optical signal of FIG. 7.

In another example study, an example AOWG was used to generate a phase modulated signal with a normalized envelope of $$E(t)=\exp(j\beta \cos(2\pi f_{mod}t)) \quad (14)$$

where $\beta$ is the phase modulation index (in this example set to 1.9 to demonstrate the measurement), and $f_{mod}$ is the frequency or repetition rate of the signal modulation (in this example 10.7 GHz, which is half of the sampling rate). In this example, the phase modulated signal has spectral content above 10 GHz, and so the high-speed sampling modules with bandwidths of 65 GHz were useful for the measurement. An example measured trace for the example signal is shown in the complex plane in FIG. 6. From the time domain data, the corresponding optical spectrum may be calculated and an example is shown in FIG. 7. The frequency resolution of this example technique may be dependent on the pattern length captured. For the example result in FIG. 7, the resolution is approximately 20 MHz. The example calculated optical spectrum was found to be in relatively good agreement with the example measured optical spectrum illustrated in FIG. 8 (in this example, with a resolution bandwidth of 0.01 nm).

Applications

The disclosed methods and systems may be useful for decoding or characterizing suitable modulated signals or modulating envelopes. Such signals may be a phase-shift keying (PSK) signal, for example a quadrature PSK signal, a binary PSK signal, a differential PSK signal or a higher-order PSK signal. Although in some examples the modulated signal may have in-phase and quadrature components, in other examples, other types of modulated signals may be used. For example, other types of modulated signals that may also be determined using the disclosed methods and systems may include amplitude modulated (AM) signals, frequency modulated (FM) signals, and quadrature amplitude modulation (QAM) signals, among others.

The disclosed methods and system may be useful where the signal has a relatively fast repetition rate, such as in optical signals or electromagnetic signals. For example, the signal may be obtained from optical clock pulse sources, for example having repetition rates in the range of about 10 GHz to about 40 GHz.

The disclosed methods and systems may also be useful for characterization of modulators and/or carrier sources. For example, a modulator may be used to encode a known or desired pattern in the modulated signal, and the resultant envelope of the modulated signal, as determined using the disclosed methods and systems, may be compared to the desired pattern. Any suitable modulator may be characterized in this manner, including, for example, a Mach Zehnder modulator or an electro-absorptive modulator. The modulator may be made of any suitable material including, for example, gallium arsenide (GaAs), indium phosphide (InP), or lithium niobate ($LiNbO_3$). The modulator may be any suitable modulator, including modulators for optical signals or electromagnetic signals, digital or analog modulations, or any other modulators of interest. Characterization of modulators and/or carrier sources may be at least partly based on determination of the phase noise difference.

As explained above, calculations may also be made to characterize system components based on determinations of noise or variance.

Example methods and systems have been described and demonstrated for measuring the envelope of a modulated optical signal, based on high- and low-bandwidth sampling. In some examples, the disclosed methods and systems may make use of the high-bandwidth available with an equivalent-time sampling oscilloscope. The use of equivalent-time oscilloscopes may be useful over conventional real-time oscilloscopes because equivalent-time oscilloscopes may be able to take samples at a higher equivalent rate and thus able to directly detect higher bandwidth signals without being limited by the real-time speed of the oscilloscope. However, the disclosed methods and systems may be used with both equivalent-time oscilloscopes (e.g., for faster signals) as well as real-time oscilloscopes (e.g., for slower signals).

Although certain example oscilloscopes have been described, the disclosed methods and systems may be performed by any one or more suitable components capable of obtaining the low bandwidth and high bandwidth samples, which may include other types of oscilloscopes and non-oscilloscope components. Other types of suitable oscilloscopes may include, for example, any oscilloscope having at least four input ports having at least two ports capable of high bandwidth sampling and at least two ports capable of low bandwidth sampling. In some examples, the samplers used to obtain low bandwidth samples may also be capable of high bandwidth sampling. In some examples, low-speed sampling modules may be used for the low bandwidth samplers since they may be less costly than high-speed sampling modules.

In some examples, from the measured results, the complete electric field modulation (e.g., including the in-phase and quadrature components) may be determined as the signal trajectory in time. Although the disclosure describes certain signal bandwidths, the methods and systems of the present disclosure may be extended to higher bandwidths (e.g., by using higher quality or faster components).

The disclosed systems and methods may be useful for measurement of high-speed optical signals, for example in research, development and/or manufacturing environments. The disclosed systems and methods may be used to augment commercially available oscilloscopes.

The present disclosure also discloses computer program products and computer readable storage media (e.g., CDs, hard disks, RAM or ROM memories, etc.) that embody computer executable instructions that may be executed by a processor to carry out the disclosed methods. The present disclosure also discloses computer signals that may cause a processor to carry out the disclosed methods.

The embodiments of the present disclosure described above are intended to be examples only. Alterations, modifications and variations to the disclosure may be made without departing from the intended scope of the present disclosure. For example, one or more of the example components described above may be replaced with one or more other suitable components. Functions of one or more of the example components described above may be combined into one suitable component or divided into multiple suitable components.

In particular, selected features from one or more of the above-described embodiments may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

REFERENCES

[1] C. Dorrer, C. R. Doerr, I. Kang, R. Ryf, J. Leuthold, and P. J. Winzer, "Measurement of eye diagrams and constellation diagrams of optical sources using linear optics and waveguide technology," *J. Lightw. Technol.*, vol. 23, no. 1, pp. 178-186, 2005.

[2] P. A. Williams, T. Dennis, I. Coddington, W. C. Swann, N. R. Newbury, "Vector signal characterization of high-speed optical components by use of linear optical sampling with milliradian resolution," *IEEE Photon. Technol. Lett.*, vol. 20, no. 23, pp. 2007-2009, 2008.

[3] I. Coddington, W. C. Swann, and N. R. Newbury, "Coherent linear optical sampling at 15 bits of resolution," *Opt. Lett.* vol. 34, no. 14, pp. 2153-2155, 2009.

[4] C. R. S. Fludger, A. Voss, T. Duthel, C. Schulien, and B. Schmauss, "Characterization of an RZ-DQPSK transmitter using coherent detection," in *Proc. European Conf. Optical Commun.*, Berlin, Germany, 2007, Paper P067.

[5] X. Liu and S. Chandrasekhar, "Measurement of constellation diagrams for 40-Gb/s DQPSK and 60-Gb/s Bary-DPSK using sampled orthogonal differential direct-detection," in *Proc. European Conf. Optical Commun.*, Berlin, Germany, 2007, paper 7.2.4.

[6] M. Westlund, M. Skold, and P. A. Andrekson, "All-optical phase-sensitive waveform sampling at 40 GSymbol/s," in *Proc. Conf. Optical Fiber Commun.*, San Diego, Calif., 2008, paper PDP12.

[7] N4391A Optical Modulation Analyzer, data sheet available from Agilent Technologies (www.agilent.com).

[8] Complex Spectral Analysis Principle, application note available from Apex Technologies (www.apex-t.com).

[9] C. Dorrer, "Interferometric techniques for the characterization of temporal modulators," *IEEE Photon. Technol. Lett.*, vol. 17, no. 12, pp. 2688-2690, 2005.

[10] P. Gallion and G. Debarge, "Quantum phase noise and field correlation in single frequency semiconductor laser systems," *IEEE J. Quantum Electron.*, vol. QE-20, no. 4, pp. 343-349, 1984.

[11] K. Roberts, C. Li, L. Strawczynski, M. O'Sullivan, and I. Hardcastle, "Electronic precompensation of optical nonlinearity," *IEEE Photon. Technol. Lett.*, vol. 18, no. 2, pp. 403-405, 2006.

[12] D. J. Krause, J. C. Cartledge, and K. Roberts, "Demonstration of 20 Gb/s DQPSK with a single dual-drive Mach-Zehnder modulator," *IEEE Photon. Technol. Lett.*, vol. 20, no. 16, pp. 1363-1365, 2008.

The invention claimed is:

1. A method for determining an envelope of a modulated signal, the method comprising:
   receiving at least two hybrid signals, the hybrid signals being obtained from mixing the modulated signal with a carrier signal, each of the hybrid signals having a phase noise difference that is a difference between phase noise of the modulated signal and phase noise of the carrier signal;
   obtaining at least two sets of low bandwidth samples, each set of low bandwidth sample being obtained from a respective one of the hybrid signals;
   obtaining at least two sets of high bandwidth samples, each set of high bandwidth sample being obtained from a respective one of the hybrid signals;
   determining the phase noise difference from the sets of low bandwidth samples; and
   determining the envelope of the modulated signal based on the determined phase noise difference, phase measurements of the sets of high bandwidth samples and amplitude measurements of the sets of high bandwidth samples, wherein the determination includes calculating for effects of the determined phase noise difference.

2. The method of claim 1 wherein determining the envelope comprises determining phase and amplitude of the envelope of the modulated signal.

3. The method of claim 1, wherein the sets of low bandwidth samples and high bandwidth samples are all substantially synchronized in time.

4. The method of claim 1, further comprising:
   receiving the modulated signal; and
   mixing the modulated signal with the carrier signal to obtain the at least two hybrid signals.

5. The method of claim 4 further comprising receiving the carrier signal.

6. The method of claim 4 wherein mixing comprises determining the carrier signal from the modulated signal.

7. The method of claim 1 wherein measurements of the sets of high bandwidth samples are taken over a time interval greater than a repetition cycle of the modulating signal.

8. The method of claim 1 wherein the phase noise difference is due to a time delay between the modulated signal and the carrier signal.

9. The method of claim 8 wherein the time delay arises due to a propagation delay between the modulated signal and the carrier signal.

10. The method of claim 1 wherein the low bandwidth samples are samples of the hybrid signal at a rate lower than a repetition rate of the modulated signal and the high bandwidth samples are samples of the hybrid signal at a rate equal to or higher than a repetition rate of the modulated signal.

11. The method of claim 1 further comprising applying a time shift between the sets of high bandwidth samples to correct for any time difference between the sets of high bandwidth samples.

12. The method of claim 1 wherein the modulated signal is an optical signal.

13. The method of claim 1 wherein the modulated signal is an electromagnetic signal.

14. The method of claim 1 further comprising calculating adjustments for the determined envelope of the modulated signal to compensate for any known deviations in at least one of the modulated signal, the carrier signal and the hybrid signal.

15. The method of claim 1 wherein obtaining the sets of low bandwidth samples comprises applying a bandpass filter to the hybrid signals, the bandpass filter having pass frequencies centered about an integer multiple of a repetition rate of the modulated signal.

16. The method of claim 1 further comprising:
 receiving timing information about the high bandwidth samples and the low bandwidth samples; and
 storing the timing information corresponding to the determined envelope of the modulated signal.

17. The method of claim 1 wherein the phase noise difference is due to a different source for the modulated signal and for the carrier signal.

18. The method of claim 1 wherein obtaining the sets of low bandwidth samples comprises applying digital signal processing to the high bandwidth samples.

19. A method for characterizing a modulator, the method comprising:
 receiving at least two hybrid signals, the hybrid signals being obtained from mixing a modulated signal from the modulator with a carrier signal, each of the hybrid signals having a phase noise difference that is a difference between phase noise of the modulated signal and phase noise of the carrier signal;
 obtaining a set of low bandwidth samples for each of the hybrid signals;
 determining the phase noise difference from the sets of low bandwidth samples; and
 characterizing the modulator based on at least the determined phase noise difference, the characterizing comprising:
  obtaining a set of high bandwidth samples for each of the hybrid signals;
  determining an envelope of the modulated signal from the sets of high bandwidth samples; and
  comparing phase and amplitude of the determined envelope with phase and amplitude of a desired envelope.

* * * * *